US009191288B2

(12) United States Patent
Rothstein et al.

(10) Patent No.: US 9,191,288 B2
(45) Date of Patent: *Nov. 17, 2015

(54) TRIGGER BASED RECORDING OF FLOWS WITH PLAY BACK

(71) Applicant: ExtraHop Networks, Inc., Seattle, WA (US)

(72) Inventors: Jesse Abraham Rothstein, Seattle, WA (US); Kevin Michael Seguin, Seattle, WA (US)

(73) Assignee: ExtraHop Networks, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/518,996

(22) Filed: Oct. 20, 2014

(65) Prior Publication Data
US 2015/0036501 A1 Feb. 5, 2015

Related U.S. Application Data

(63) Continuation of application No. 13/831,908, filed on Mar. 15, 2013, now Pat. No. 8,867,343.

(51) Int. Cl.
H04L 12/26 (2006.01)
H04L 12/70 (2013.01)
H04L 12/861 (2013.01)

(52) U.S. Cl.
CPC .............. *H04L 43/04* (2013.01); *H04L 43/026* (2013.01); *H04L 43/045* (2013.01); *H04L 43/0894* (2013.01); *H04L 43/18* (2013.01); *H04L 47/00* (2013.01); *H04L 49/9084* (2013.01); *H04L 43/028* (2013.01)

(58) Field of Classification Search
CPC ....... H04L 43/00; H04L 43/04; H04L 43/045; H04L 43/08; H04L 63/1416
See application file for complete search history.

(56) References Cited

U.S. PATENT DOCUMENTS

| 5,430,727 | A | | 7/1995 | Callon |
| 5,541,995 | A | | 7/1996 | Normile et al. |
| 5,787,237 | A | | 7/1998 | Reilly |
| 5,802,599 | A | * | 9/1998 | Cabrera et al. ............... 711/170 |
| 5,835,726 | A | | 11/1998 | Shwed et al. |
| 6,141,686 | A | | 10/2000 | Jackowski et al. |

(Continued)

OTHER PUBLICATIONS

OA Communication for U.S. Appl. No. 13/831,673 mailed on Sep. 30, 2013.

(Continued)

*Primary Examiner* — Gregory Sefcheck
*Assistant Examiner* — Jenkey Van
(74) *Attorney, Agent, or Firm* — John W. Branch; Lowe Graham Jones PLLC

(57) ABSTRACT

The various embodiments provide selective real-time monitoring of one or more flows of packets over a network, real-time buffering of packets for the one or more monitored flows, real-time recording of packets for one or more monitored flows and its corresponding buffered packets based on initiation of at least one trigger, and real-time analysis of the one or more recorded flows of packets regarding at least the occurrence of the at least one trigger. One or more flows of packets may be selected for monitoring by an administrator or an automated process based on different factors. In at least one of the various embodiments, the one or more monitored flows of packets are tagged and threaded so that they are separately accessible in a ring buffer.

24 Claims, 10 Drawing Sheets

(56) References Cited

U.S. PATENT DOCUMENTS

| | | |
|---|---|---|
| 6,401,150 B1 | 6/2002 | Reilly |
| 6,765,909 B1 | 7/2004 | Sen et al. |
| 6,807,156 B1 | 10/2004 | Veres et al. |
| 7,089,326 B2 | 8/2006 | Boucher et al. |
| 7,193,968 B1 | 3/2007 | Kapoor et al. |
| 7,313,141 B2 | 12/2007 | Kan et al. |
| 7,480,292 B2 | 1/2009 | Busi et al. |
| 7,545,499 B2 | 6/2009 | Overbeck et al. |
| 7,602,731 B2 | 10/2009 | Jain |
| 7,864,764 B1 | 1/2011 | Ma et al. |
| 7,979,555 B2 | 7/2011 | Rothstein et al. |
| 8,079,083 B1 * | 12/2011 | Bennett et al. ............ 726/23 |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 2002/0024964 A1 | 2/2002 | Baum et al. |
| 2002/0080720 A1 | 6/2002 | Pegrum et al. |
| 2002/0091844 A1 | 7/2002 | Craft et al. |
| 2003/0152094 A1 | 8/2003 | Colavito et al. |
| 2003/0204621 A1 | 10/2003 | Poletto et al. |
| 2003/0214913 A1 | 11/2003 | Kan et al. |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093513 A1 | 5/2004 | Cantrell et al. |
| 2004/0250059 A1 | 12/2004 | Ramelson et al. |
| 2005/0060427 A1 | 3/2005 | Phillips et al. |
| 2005/0091357 A1 | 4/2005 | Krantz et al. |
| 2005/0100000 A1 | 5/2005 | Faulkner et al. |
| 2005/0182833 A1 | 8/2005 | Duffie et al. |
| 2005/0210242 A1 | 9/2005 | Troxel et al. |
| 2006/0029096 A1 | 2/2006 | Babbar et al. |
| 2006/0045017 A1 | 3/2006 | Yamasaki |
| 2006/0123477 A1 | 6/2006 | Raghavan et al. |
| 2007/0088845 A1 * | 4/2007 | Memon et al. ............ 709/234 |
| 2007/0156919 A1 | 7/2007 | Potti et al. |
| 2007/0192863 A1 | 8/2007 | Kapoor et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0222717 A1 | 9/2008 | Rothstein et al. |
| 2009/0225675 A1 | 9/2009 | Baum et al. |
| 2009/0245083 A1 | 10/2009 | Hamzeh |
| 2009/0296593 A1 | 12/2009 | Prescott |
| 2010/0091770 A1 * | 4/2010 | Ishikawa ............ 370/389 |
| 2010/0095367 A1 | 4/2010 | Narayanaswamy |
| 2010/0250928 A1 | 9/2010 | Goto |
| 2010/0316216 A1 | 12/2010 | Fukushima et al. |
| 2010/0322248 A1 | 12/2010 | Ivanov |
| 2011/0019574 A1 | 1/2011 | Malornsoky et al. |
| 2011/0073490 A1 | 3/2011 | Hayamizu et al. |
| 2011/0280149 A1 | 11/2011 | Okada et al. |
| 2012/0176917 A1 | 7/2012 | Matityahu et al. |
| 2012/0215328 A1 | 8/2012 | Schmelzer |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy |
| 2013/0061036 A1 | 3/2013 | Oliver |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0232104 A1 | 9/2013 | Goyal et al. |
| 2014/0040451 A1 | 2/2014 | Agrawal et al. |
| 2014/0242972 A1 | 8/2014 | Slotznick |

OTHER PUBLICATIONS

OA Communication for U.S. Appl. No. 13/831,673 mailed on Mar. 6, 2014.
OA Communication for U.S. Appl. No. 13/831,673 mailed on May 22, 2014.
OA Communication for U.S. Appl. No. 14/107,580 mailed on Mar. 6, 2014.
OA Communication for U.S. Appl. No. 13/831,908 mailed on Jun. 25, 2014.
OA Communication for U.S. Appl. No. 14/500,893 mailed on Nov. 20, 2014.
OA Communication for U.S. Appl. No. 13/831,908 mailed on Apr. 7, 2014.
OA Communication for U.S. Appl. No. 13/831,908 mailed on Aug. 9, 2013.
OA Communication for U.S. Appl. No. 13/831,908 mailed on Jan. 13, 2014.
OA Communication for U.S. Appl. No. 13/831,908 mailed on Aug. 22, 2013.
Handel et al. "Hiding Data in the OSI Network Model," Los Alamos, New Mexico, 1996, 16 pages.
OA Communication for U.S. Appl. No. 14/107,631 mailed on Feb. 20, 2014.
OA Communication for U.S. Appl. No. 14/107,631 mailed on Sep. 26, 2014.
OA Communication for U.S. Appl. No. 14/107,580 mailed on Sep. 15, 2014.
OA Communication for U.S. Appl. No. 14/500,893 mailed on Feb. 18, 2015.
OA Communication for U.S. Appl. No. 14/107,631 mailed on Dec. 30, 2014.
OA Communication for U.S. Appl. No. 13/831,626 mailed on Sep. 3, 2013.
Handley et al., "Network Intrusion Detection: Evasion, Traffic Normalization, and End-to-End Protocol Semantics," 2011, International Computer Science Institute, 17 pages.
Information Sciences Institute, "Internet Protocol Darpa Internet Program Protocol Specification," Sep. 1981, 36 pages.
Fuertes, "Evaluation of OSPF Extensions in MANET Routing," Paris, 2007, 192 pages.
Parsons, "Moving Across the Internet: Code-Bodies, Code-Corpses, and Network Architecture," May 9, 2010, 20 pages.
Zander et al., "Covert Channels and Countermeasures in Computer Network Protocols," Dec. 2007, 7 pages.

* cited by examiner

TRIGGER BASED RECORDING OF FLOWS WITH PLAY BACK

CROSS-REFERENCE TO RELATED APPLICATIONS

This application is a Continuation of U.S. patent application Ser. No. 13/831,908 filed on Mar. 15, 2013, entitled "TRIGGER BASED RECORDING OF FLOWS WITH PLAY BACK," the benefit of the earlier filing date of which is hereby claimed under 35 U.S.C. §120 and 37 C.F.R. §1.78, and which is further incorporated by reference in its entirety.

FIELD OF THE INVENTION

The present invention is generally directed to monitoring flows of packets over a network, and more particularly, it is directed to recording one or more flows if a trigger occurs.

BACKGROUND OF THE INVENTION

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transport Communication Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. Additionally, the HTTP protocol is listed on the seventh layer of the OSI model and on the fourth layer of the TCP/IP model.

To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. In other instances, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In still other instances packet copies may be provided to the network monitors from a specialized network tap.

In some instances, a network monitor may operate as a proxy that is actively arranged between two endpoints, such as a client device and a server device. A network monitor proxy intercepts each packet sent by each endpoint and retransmits or forwards each intercepted packet to the other endpoint. Since network monitor proxies actively monitor network packets, they often enable a variety of additional services such as caching, content filtering, and access control.

However, the sheer volume of packets that are regularly communicated over networks in even a short period of time has made it relatively difficult and/or inefficient for network monitors in real time to record and store all monitored packets in a readily accessible format that is both useful for analysis and helpful for troubleshooting a particular issue or event.

Additionally, one challenge with continuous packet recording is that hard disks are relatively slow compared to network speeds. Other memory media like Dynamic Access Random Memory devices (DRAMs) are fast and can keep up with network speeds, but their storage size is relatively limited (or cost prohibitive), which is why a DRAM buffer can historically only go back in time for a limited amount. Also, even a Redundant Array of Independent Disks (RAIDs) with substantially greater capacity have trouble keeping up with network speeds.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE VARIOUS EMBODIMENTS

Figure 1:
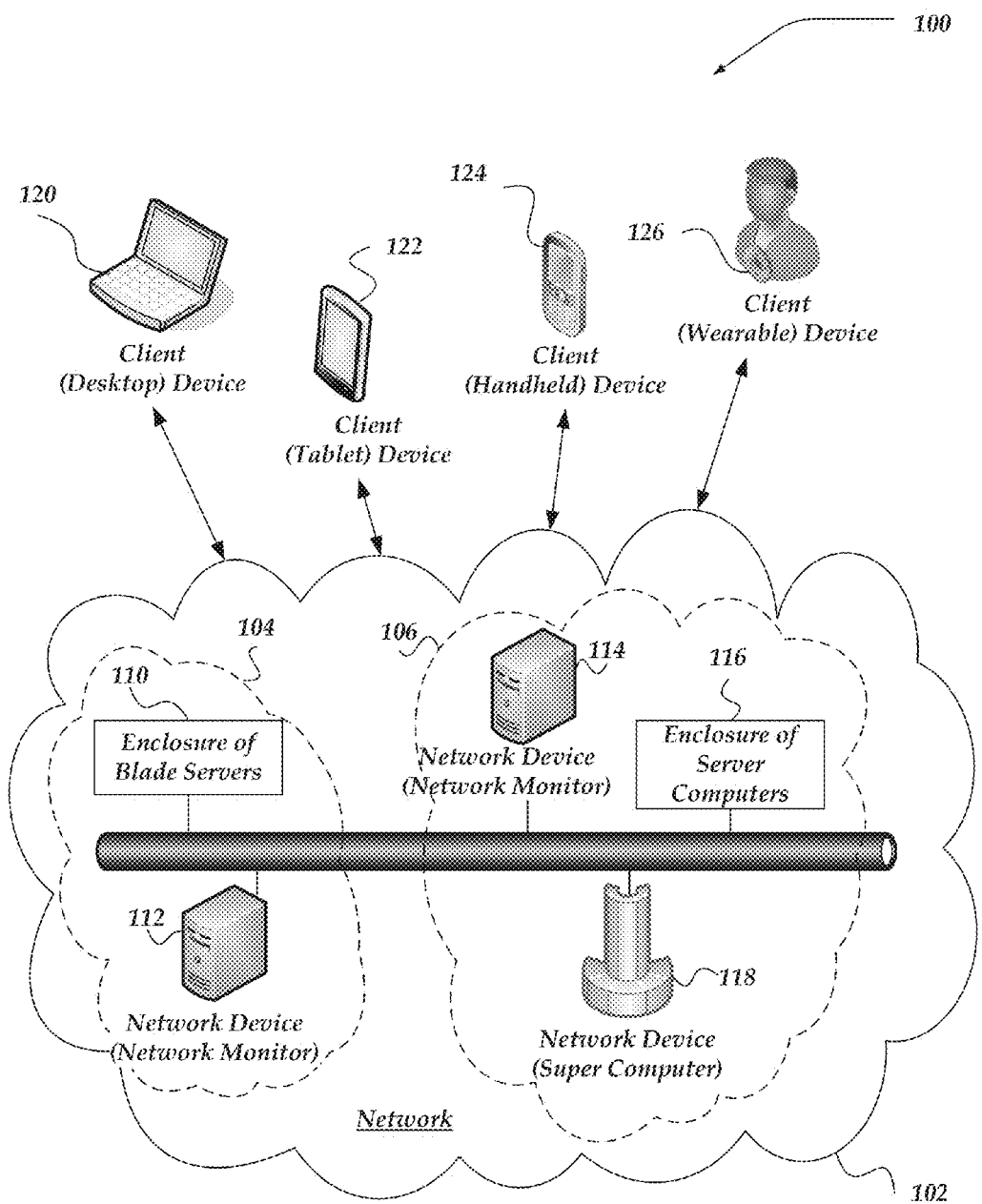
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection oriented communication. A session also is the basic step to transmit in connectionless communication modes.

As used herein, the term "connection" refers to a communication session with a semi-permanent connection for interactive packet interchange between two or more communicating endpoints, such as network devices. The connection is established before any useful data is transferred, and where a stream of data is delivered in the same order as it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths.

Connection oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "flow" refer to one packet or a stream of packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with a handshake and creates a single bi-directional flow between two endpoints, e.g., one direction of the flow going from endpoint A to endpoint B, the other direction of the flow going from endpoint B to endpoint A, where endpoint A and endpoint B are IP-Port source and destinations. In at least one of the various embodiments, a tuple may be employed to identify a flow. In some embodiments, a tuple may include attributes, such as VLAN, IP protocol, or the like. Also, other protocols may establish a separate flow for control information that enables management of at least one or more flows between two or more endpoints.

As used herein, the terms "network monitor", "network monitor device", or "NMD" refer to an application (software, hardware, or some combination) that is arranged to monitor and record flows of packets in a session that are communicated between at least two endpoints over at least one network. The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from end points such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. The NMD may attempt to classify the network traffic according to communication protocols that are used. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, TDS, TCP, IP, and the like.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the various embodiments are directed towards selectively monitoring in real time one or more flows of packets over a network, real-time buffering of packets for the one or more monitored flows, real-time recording of packets for one or more monitored flows and its corresponding buffered packets based on at least one trigger, real-time analysis of the one or more recorded flows of packets based at least on initiation of the at least one trigger, and subsequent retrieval of the one or more recorded flows of packets.

In at least one of the various embodiments, one or more flows of packets over the network may be selected for real-time monitoring by an administrator of the network or an automated process based on different factors. For example, flows may be selected for monitoring that correspond to an application, node, network device, or the like, that is communicating over the network. Further, related flows may be identified and selected for monitoring, e.g., one or more flows that correspond to a selected application, node, network device, or the like. In at least one of the various embodiments, the one or more monitored flows of packets are tagged and threaded for buffering so that they are separately accessible in a buffer, such as a ring buffer. Also, the buffered flows are accessible in real time for analysis.

In at least some of the various embodiments, the buffer includes at least a high-speed read/write memory media, such as DRAM, Static Random Access Memory (SRAM), or the like. By buffering the individual monitored flows (subset of all of the monitored traffic) in a high speed memory media, the buffer can more readily keep up with the network flows. Also, by analyzing the monitored flows in real-time, and upon the satisfaction of recording criteria, the process can head backwards into a ring buffer composed of high speed memory media to retrieve and record/store received packets for subsequent real time analysis. In at least one of the various embodiments, if at least one monitored flow dominates a capacity of the buffer over other monitored flows, the buffering of the dominant monitored flow may be throttled back, e.g., restricting a number of packets that may be buffered per second to the buffer for the dominant monitored flow. Moreover, in at least one of the various embodiments, a new buffer may be instantiated to separately buffer a monitored flow that dominates a capacity of a buffer over other monitored flows.

Additionally, in at least one of the various embodiments, if the capacity of a buffer is exceeded by the buffering of the one or more flows, the overflow may be stored in a separate datastore and/or the capacity of the buffer may be increased. Additionally, since not all of the flows on the network are necessarily selected for monitoring, the capacity of the buffer may be optimized for buffering the selected flows.

In at least one of the various embodiments, any amount of different triggers/filters may be arranged either singly, or in combination, to initiate the real-time recording of a corresponding monitored flow and optionally any related monitored flows too. The real-time recording of the monitored flow includes those packets in the buffer that correspond to the monitored flow prior to the initiation of the trigger and any new packets that are subsequently received. A trigger is not limited to any particular type or combination with other triggers.

In at least one of the various embodiments, analysis of a recorded flow may be based on playing back at least a portion of the recording, which may be arranged based on one or more selected values, including, but not limited to a time, byte pattern, offset, sequence number, checksum, pointer, destination port, source port, payload, or the like.

In at least one embodiment, the play-back actions may be associated with a dashboard that may be arranged to operate automatically and/or manually. Further, a display may be provided for displaying information regarding one or more packets and/or information regarding the recorded flow, play back of the recorded flow, and/or other monitored flows. In at least one embodiment, real-time analysis may be performed on the recorded flow and/or the play back of the recorded flow, which may include statistics, reports, or the like. In at least one embodiment, the analysis may be provided to a separate application for subsequent processing.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include module, processes, components, services, or the like, and which are operative to perform as a Network Monitor Device (NMD). These NMDs are arranged to monitor and record flows of packets in a session that are communicated between at least two endpoints over at least one network. These NMDs can provide information for assessing different aspects of these monitored flows. In at least one embodiment, the NMDs passively monitor network packet traffic without participating in the communication protocols. Both network devices 112 and 114 are arranged to operate as NMDs that may perform actions as further described in conjunction with at least the figures beginning at FIG. 6.

Also, in at least one of the various embodiments, enclosure of blade servers 110, enclosure of enclosure of server computers 116, super computer network device 118 may include network devices that perform the actions of NMDs. In at least one embodiment, at least one blade server or at least one server computer may be arranged to also operate as an NMD.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G), and $6^{th}$ (6G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
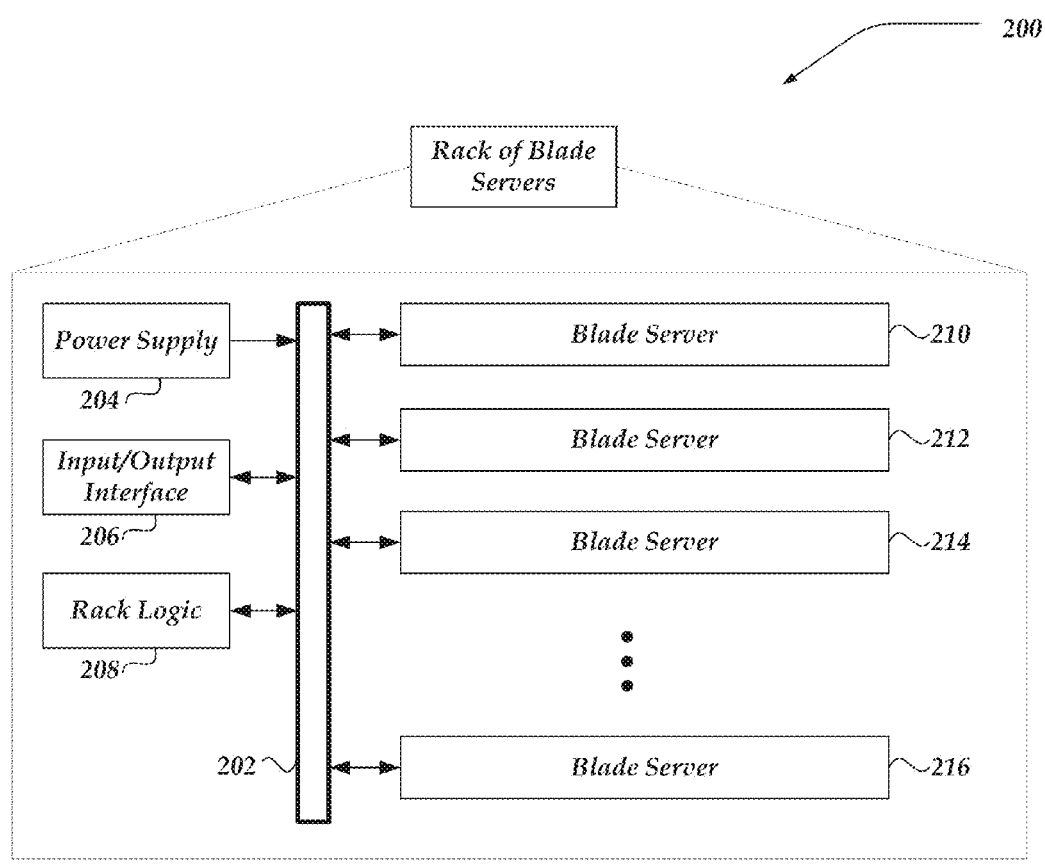
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
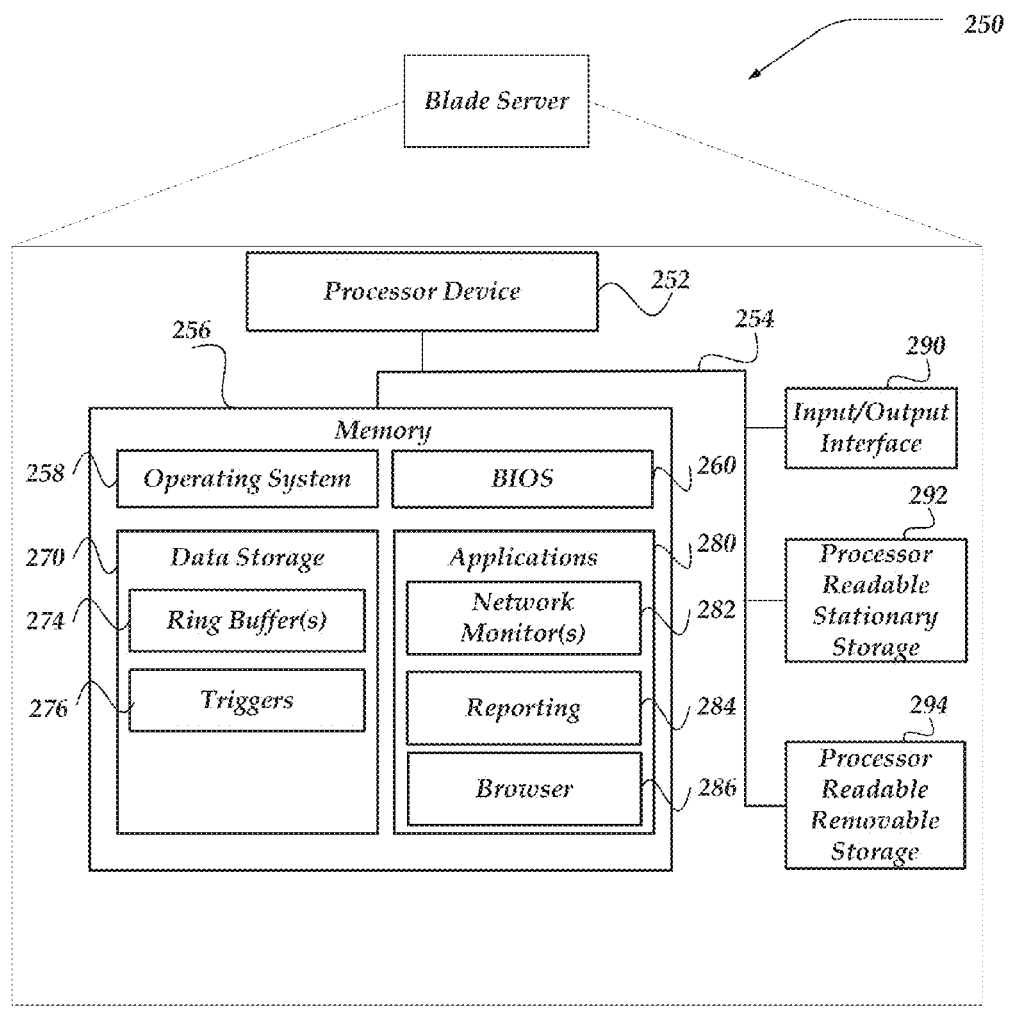
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-9. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, Ring Buffer(s) 274, Triggers 276, or the like. Ring Buffer 274 is arranged to buffer in real time those packets associated with a monitored flow, as well as other supporting data. Likewise, Triggers 276 may contain real-time triggers and/or trigger point registrations, and other supporting data, arranged in lists, databases, configuration files, or the like. Initiation of Triggers 276 enables packets buffered in real time by Ring Buffer 274 for a particular monitored flow to be recorded for analysis, such as play back.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Network Monitor(s) 282, Reporting application 284, and Browser 286, which may be enabled to perform actions further described below starting with at least FIG. 6.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, network monitor application 282, and reporting application 284 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment. Likewise, in at least one of the various embodiments, virtual machines and/or virtual servers dedicated to running network monitor application 282 and reporting application 284 may be provisioned and de-commissioned automatically.

Also, in at least one of the various embodiments, Ring buffer 274 and Triggers 276, or the like, may be located on virtual servers running in a cloud-based computing environment rather than being tied to one or more specific physical blade servers.

Illustrative Client Device

Figure 3:
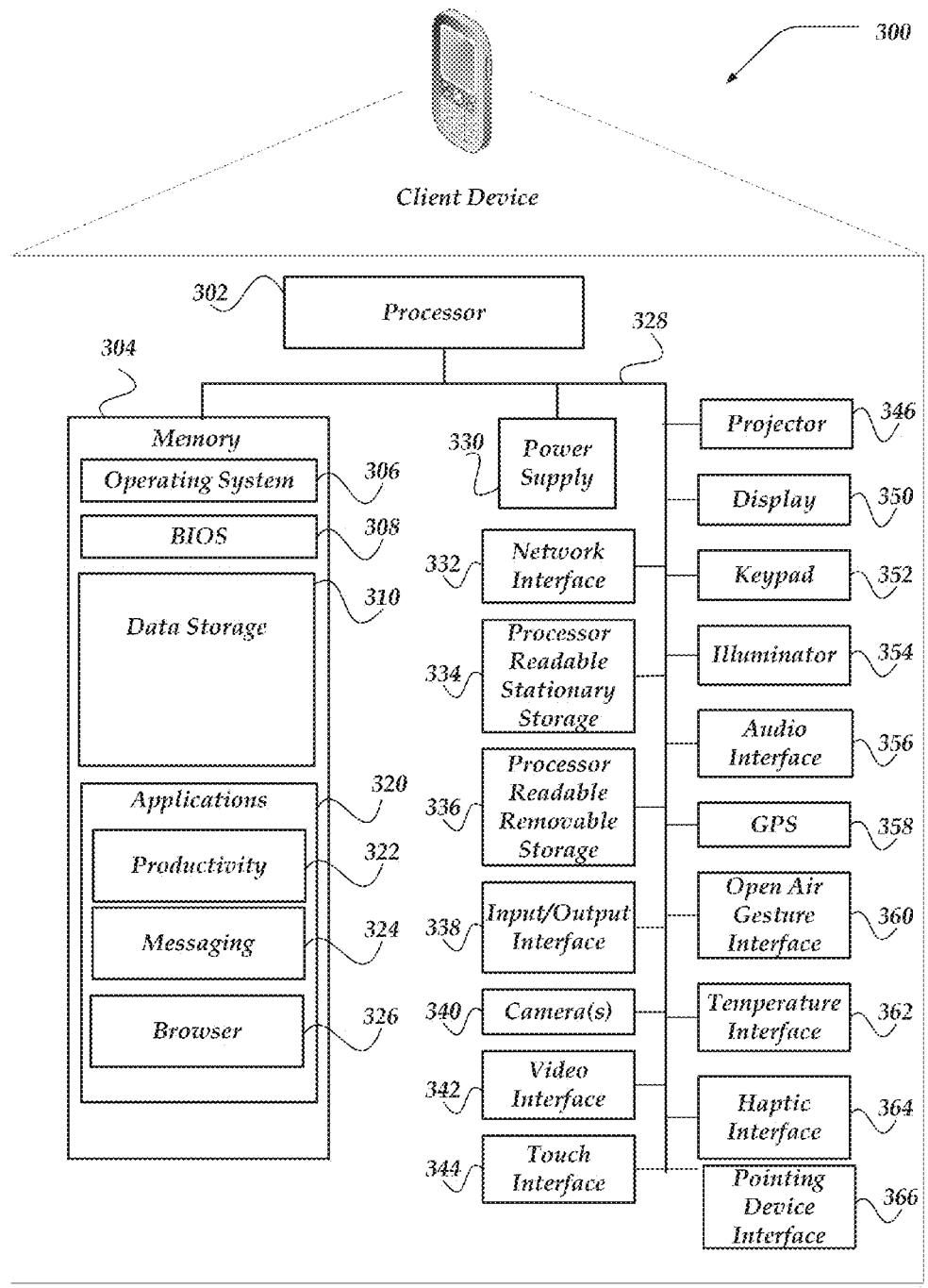
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, productivity application 322. In at least one of the various embodiments, productivity application 322, messaging application 324, and browser application 326 may be used to communicate with blade servers 110, server computers 116 and/or Supercomputer 118, and/or cloud code device 112, including, but not limited to, queries, searches, API calls, content, data, messages, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
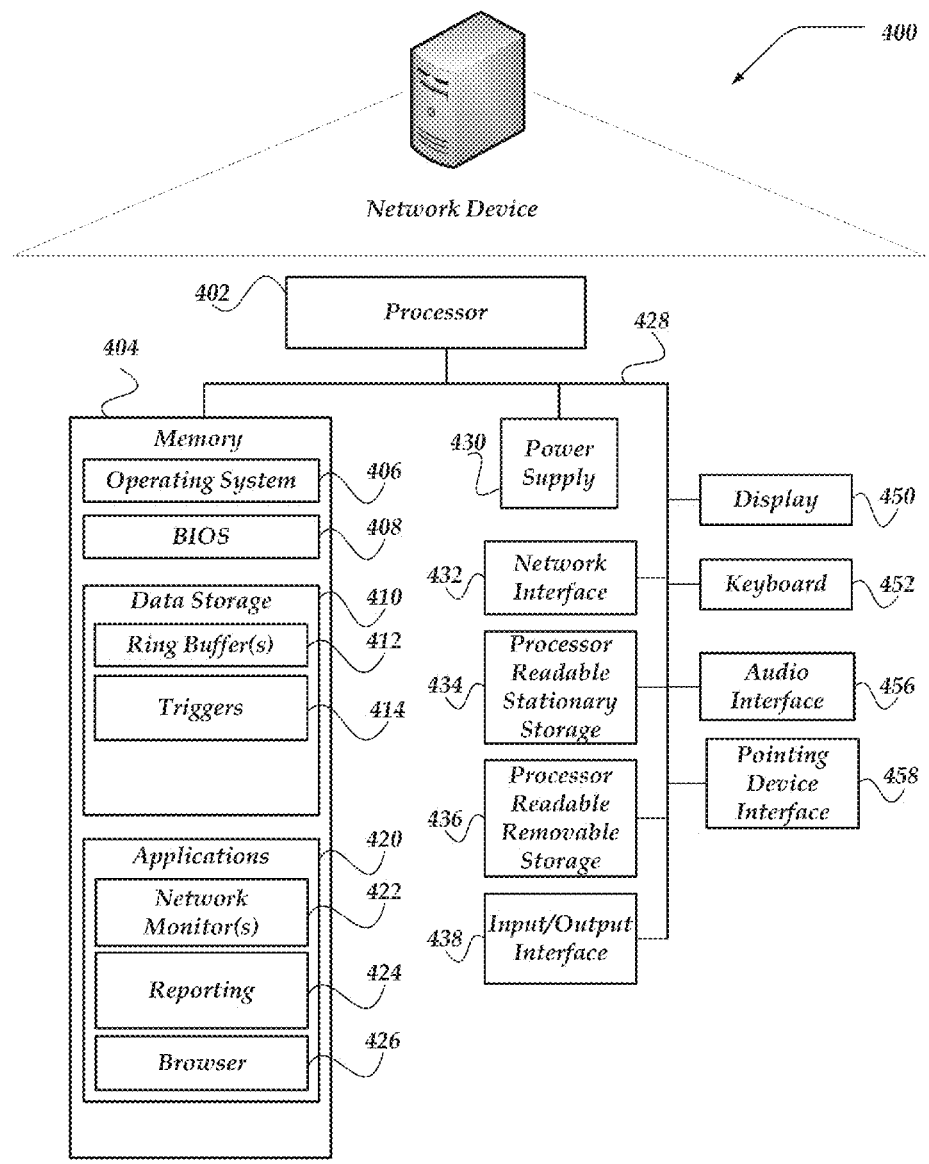
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-9. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, Ring Buffer(s) 412, and Trigger(s) 414.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include Network Monitor application 422, Reporting application 424, and Browser application 426 which may be enabled to perform actions further described below starting with at least FIG. 6. In at least one of the various embodiments, while they may be illustrated here as separate applications, Network Monitor application 422 and/or Reporting application 424 may be implemented as modules and/or components of the same application. Further, in at least one of the various embodiments, Network Monitor application 422 and/or Reporting application 424 may be implemented as operating system extensions, modules, plugins, or the like.

Furthermore, in at least one of the various embodiments, Network Monitor application 422 and Reporting application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running Network Monitor application 422 and/or Reporting application 424 may be provisioned and de-commissioned automatically.

Also, in at least one of the various embodiments, Ring Buffer(s) 412 and Trigger(s) 414, or the like, may located in virtual servers running in a cloud-based computing environment rather than being tied to one or more specific physical blade servers or server computer devices.

Illustrative Passive Arrangement of Network Monitor Device

Figure 5:
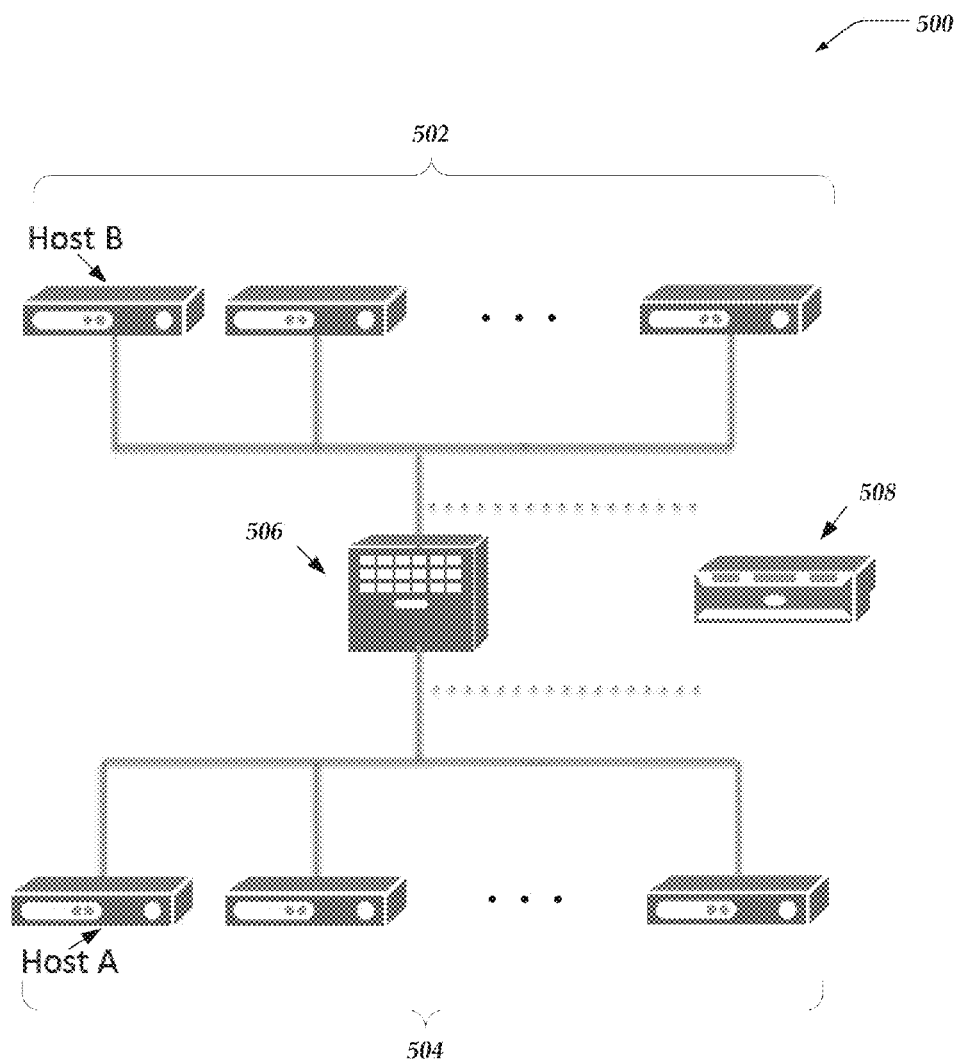
FIG. 5 shows a portion of a logical architecture for an NMD to passively monitor communication over at least one network.

FIG. 5 shows one embodiment of system 500 that includes a plurality of network devices on first network 502 and a plurality of network devices on second network 504. Communication between the first network and the second network is managed by switch 506. Also, NMD 508 is arranged to passively monitor and record packets that are communicated in flows between a network device on first network 502 and second network 504. For example, the communication of flows of packets between the Host B network device and the Host A network device are managed by switch 506 and network device 508 is operative to passively monitor and record these flows.

NMD 508 can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). The port mirroring enables real-time analysis and debugging of network communications. Port mirroring can be performed in real time for inbound or outbound packet traffic (or both) on single or multiple interfaces.

Generalized Operation

Figure 6:
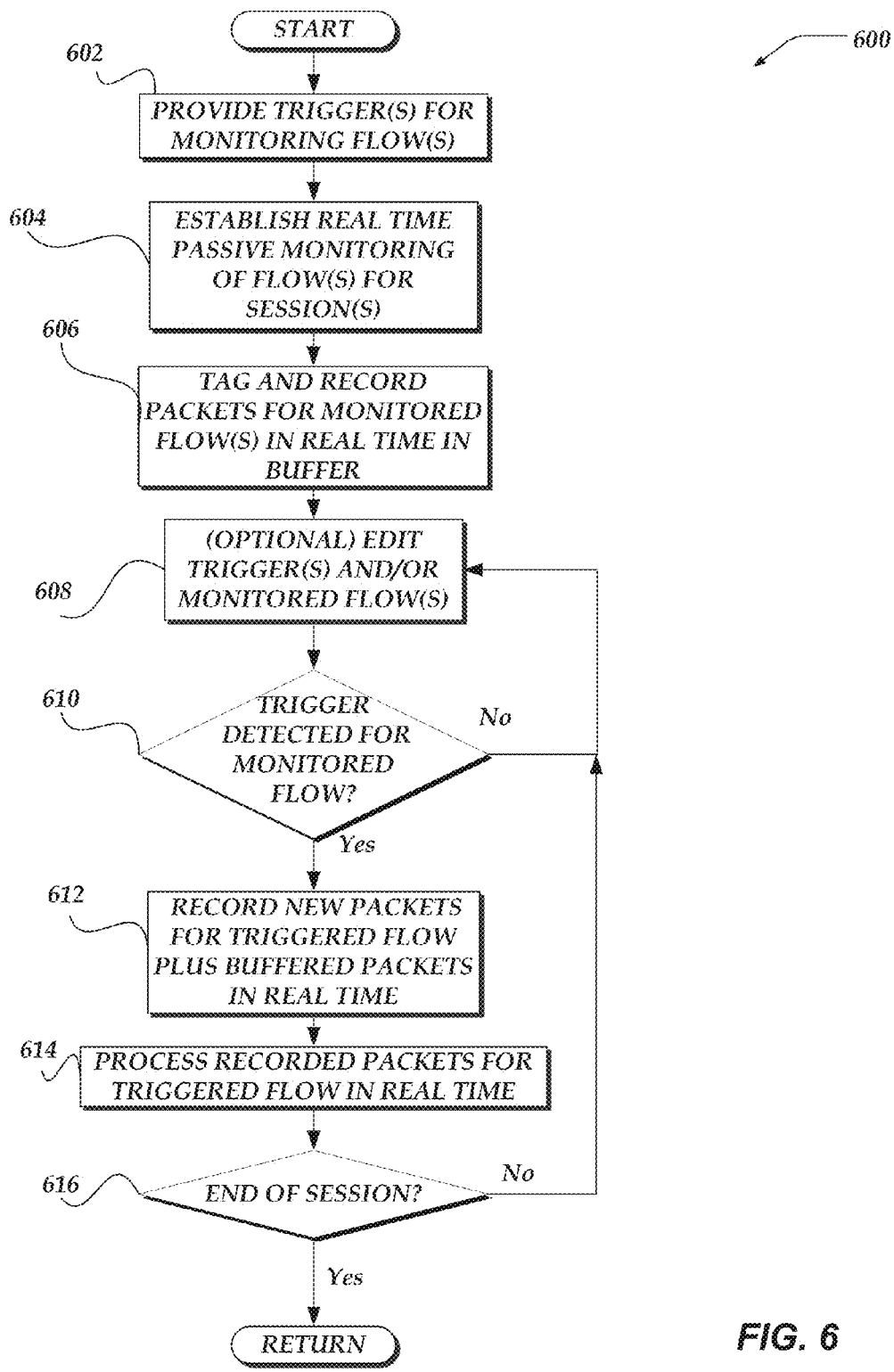
FIG. 6 illustrates a flowchart for an exemplary process for real-time trigger based recording of flows.

FIG. 6 illustrates a flowchart for an exemplary process 600 for real-time monitoring and analysis of selectively monitored flows, and trigger-based recording of selectively monitored and buffered packets that enable back-in-time analysis and/or retrieval. Moving from the start block, the process steps to block 602 and at least one trigger, such as a filter, is provided for selected flows of packets monitored in real time.

In at least one of the various embodiments, any amount of different triggers/filters may be arranged either singly, or in combination, to initiate real-time recording of a corresponding monitored flow and optionally any related monitored flows. The real-time recording of the monitored flow includes the packets buffered prior to the initiation of the trigger that correspond to the monitored flow and any new packets for the monitored flow that are received after the trigger is initiated. A trigger is not limited to any particular type or combination with other triggers. Exemplary triggers may include, but is not limited to: (1) detecting threshold violations in one or more monitored flows of packets; (2) a byte pattern in a packet for a monitored flow; (3) a service, such as email, that is disrupted; (4) detection of an attack such as denial of service; (5) a significant increase in the load on the network; (6) overflowing a capacity of the buffer; and (7) initiation by an administrator of an NMD. Also, in at least one embodiment, the initiation of a trigger my enable actions, e.g., the execution of a batch file or a program, the sending of a message or an alert, or the like.

Triggers may also include triggers for transactions that occur at layer 7 of the OSI model. These transaction-level triggers may be based on an analysis of transaction-level attributes, such as, but not limited to, users, files, database tables, or the like. Exemplary transaction-level triggers may include, but are not limited to: 1) a specific user accessing a specific resource; 2) a database query larger than a threshold; 3) a database query timing out or taking longer than a threshold time period; 4) a failed login attempt; 5) an application-level protocol error; 6) a packet with an HTTP 500 status code; or the like. In yet other embodiments, a trigger may affect other related flows. In at least one such embodiment, a trigger of one flow may act as the trigger of another flow, even though the other flow is not directly associated with the original trigger.

At block 604, passive monitoring of selected flows in real time for sessions on a network is established. Also, in at least one of the various embodiments, one or more flows of packets over the network may be selected for real-time monitoring by an administrator of the network or an automated process based on different factors. For example, flows may be selected for real-time monitoring that correspond to an application, node, network device, or the like, that is communicating over the network. Further, related flows may be identified and selected for real-time monitoring, e.g., one or more flows that also correspond to the same application, node, network device, or the like, as another flow that was previously selected for monitoring. Thus, a flow that is not selected may not be monitored in real time.

At block 606, the one or more monitored flows of packets are buffered in real time in a buffer e.g., a ring buffer. The buffered flows are tagged and threaded so that they are separately accessible from the buffer. Advancing to block 608, editing of one or more triggers and one or more flows for real-time monitoring may be optionally performed. For example, one or more related flows may be newly discovered for currently monitored flows, an existing trigger may be modified, or a new trigger may be added.

Flowing to decision block 610, a determination is made as to whether a trigger is detected/initiated for one or more real-time monitored flows. If false, the process loops back to block 608 where substantially the same process discussed above is performed. However, if the determination at decision block 610 is true, the process moves to block 612 and packets are recorded in real time for the one or more monitored flows that initiated the trigger. The real-time recording of the triggered flow includes packets that are monitored after the initiation of the trigger and those packets that were previously buffered for that monitored flow.

In some embodiments, packets for a plurality of flows may be monitored and buffered (e.g., at block 606). A trigger may be detected for one or more of the plurality of flows (e.g., at decision block 610). The previously buffered packets associated with these one or more monitored flows may be recorded back-in-time, which may be referred to flow-based recording with per-flow back-in-time capabilities. In some embodiments, each packet that was previously buffered that is associated with the flow that corresponds to the detected trigger may be recorded.

In at least one of the various embodiments, any amount of different triggers/filters may be arranged either singly, or in combination, to initiate the real-time recording of a corresponding monitored flow and optionally any related monitored flows too. A trigger is not limited to any particular type or combination with other triggers. Exemplary triggers may include, but is not limited to: (1) detecting threshold violations in one or more monitored flows of packets; (2) a byte pattern in a packet for a monitored flow; (3) a service, such as email, that is disrupted; (4) detection of an attack such as denial of service; (5) a significant increase in the load on the network; (6) overflowing a capacity of the buffer; and (7) initiation by an administrator of an NMD. Also, in at least one embodiment, the initiation of a trigger my enable the execution of a batch file or a program, the sending of a message or an alert, or the like.

Triggers may also include triggers for transactions that occur at layer 7 of the OSI model. These transaction-level triggers may be based on an analysis of transaction-level attributes, such as, but not limited to, users, files, database tables, or the like. Exemplary transaction-level triggers may include, but are not limited to: 1) a specific user accessing a specific resource; 2) a database query larger than a threshold; 3) a database query timing out or taking longer than a threshold time period; 4) a failed login attempt; 5) an application-level protocol error; 6) a packet with an HTTP 500 status code; or the like. In yet other embodiments, a trigger may affect other related flows. In at least one such embodiment, a trigger of one flow may act as the trigger of another flow, even though the other flow is not directly associated with the original trigger.

At block 614, at least the recorded packets for the triggered flow are processed for analysis in real time. The real-time analysis may include play back of at least a portion of the triggered flow, as discussed in more detail for FIG. 8.

Moving to decision block 616, a determination is made as to whether the real-time monitoring of flows is ended. In some embodiments, this determination may be based on a lack of data and/or packets being transmitted between the endpoints. In other embodiments, this determination may be based on the session timing out. In yet other embodiments, this determination may be based on a session termination handshake between the endpoints. If negative, the process loops back to block 608 and performs substantially the same actions discussed above. However, if the determination at decision block 616 is affirmative, the process returns to performing other actions.

Figure 7:
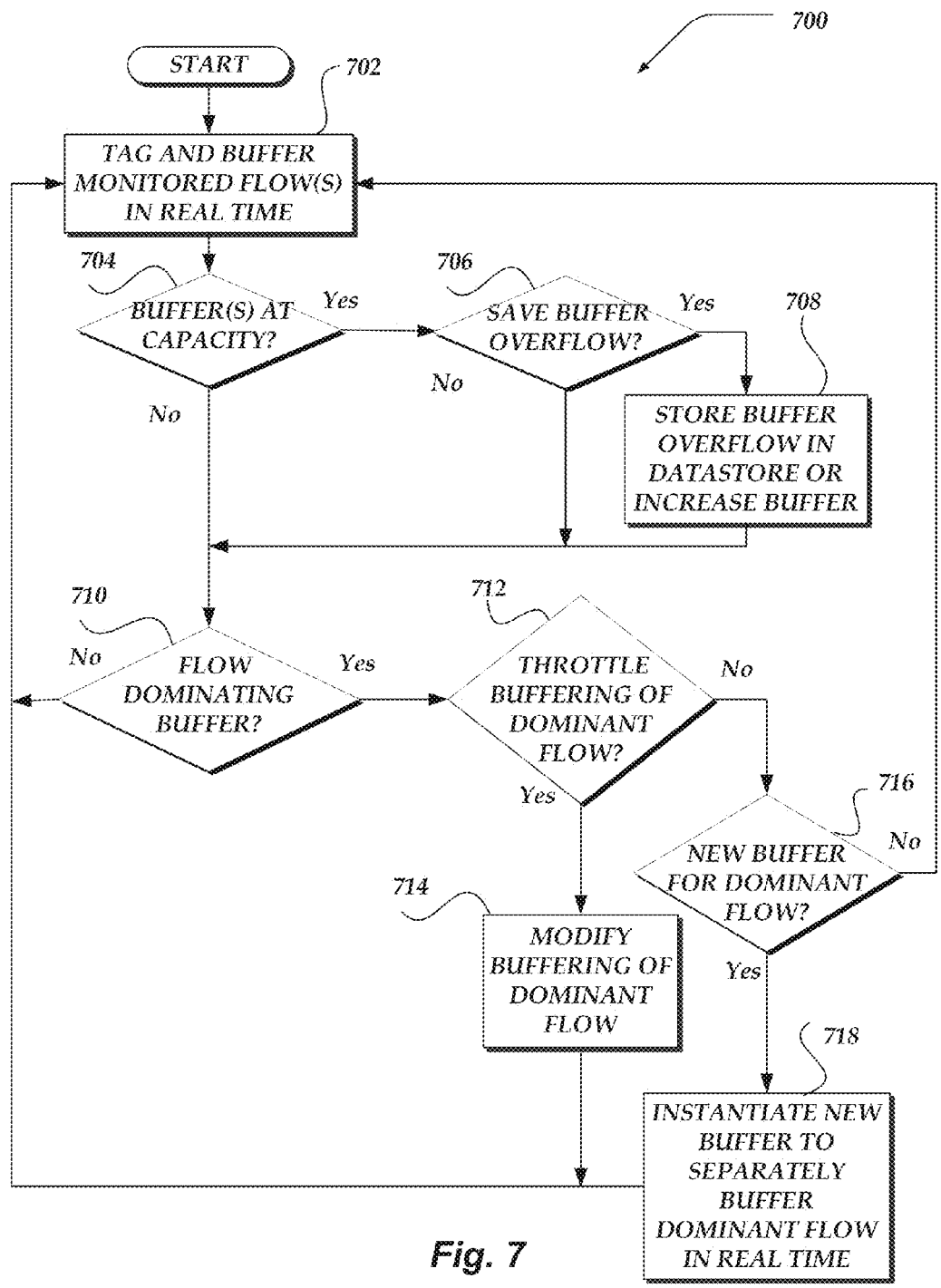
FIG. 7 shows a flowchart for an exemplary process for real-time buffering monitored flows.

FIG. 7 shows a flowchart for exemplary process 700 for real-time buffering of monitored flows of packets. Stepping from a start block to block 702, the one or more real-time monitored flows are tagged and their corresponding packets are buffered in real time in a buffer. In at least one of the various embodiments, a ring buffer is employed to buffer and thread one or more monitored flows of packets. In yet at least another of the various embodiments, a First In First Out buffer may be employed. In at least one of the various embodiments, a flow table is employed to identify each monitored flow for each corresponding buffered packet. Further, each entry corresponding to a buffered packet in the flow table may also include a direct or indirect reference to the preceding buffered packet for that particular monitored flow.

At decision block 704, a determination is made as to whether a capacity of the buffer is exceeded by the real-time buffering of the one or more monitored flows. If affirmative, the process moves to decision block 706 where a determination is made as to whether the buffer's overflow should be saved. If affirmative, the process advances to block 708 where the buffer's overflow packets may be stored in a datastore, such as a disk storage device, or the like, and/or the capacity of the buffer may be increased to buffer more packets.

Next, the process advances to decision block 710. Also, if the determinations at either decision blocks 704 or 706 were negative, the process would have advanced directly to block 710 instead of as described above. In any case, at decision block 710 a determination is made as to whether at least one real-time monitored flow of packets is dominating the capacity of the buffer at the expense of buffering other monitored packets. For example, a dominant monitored flow might provide a thousand packets every second for buffering while other monitored flows might average one packet every 10 seconds for buffering. In this case, the capacity of the buffer might be almost exclusively employed by the dominant monitored flow.

If the determination at decision block 710 is false, the process returns to block 702 and resumes performing substantially the same actions described above. However, if the determination at decision block 710 is true, the process advances to decision block 712 where a determination is made as to whether to throttle down the real-time buffering of the dominant monitored flow. If true, the process moves to block 714 where the buffering of the dominant monitored flow is modified. For example, a sampling of the packets of the dominant monitored flow may be buffered and the remaining packets may not be buffered. Next, the process returns to block 702 and performs substantially the same actions described above.

Alternatively, if the determination at decision block 712 is negative, the process advances to decision block 716 where a determination is made as to whether to provide a new buffer for real-time buffering for the dominant monitored flow. If negative, the process returns to block 702 and performs substantially the same actions described above and the dominant monitored flow continues to dominate the capacity of the buffer. However, if the determination at decision block 716 is affirmative, the process moves to block 718 where a new buffer is instantiated to separately buffer the dominant monitored flow. Next, the process returns to block 702 and resumes performing substantially the same actions described above.

Figure 8:
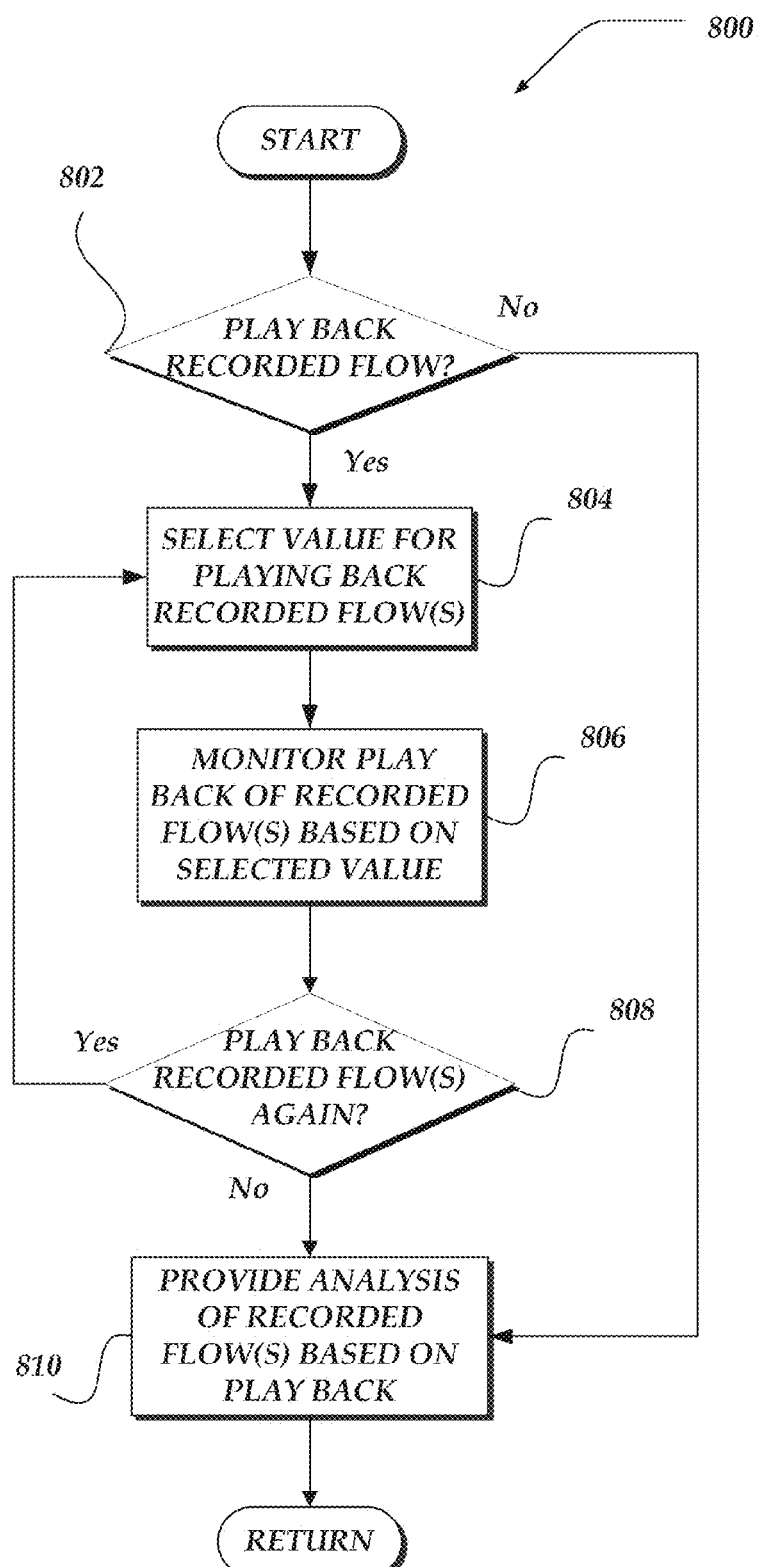
FIG. 8 illustrates a flowchart for an exemplary process for real-time analysis of recorded flows with retrieval.

FIG. 8 illustrates a flowchart for exemplary process 800 that enables analysis of recorded of flows with play back. Moving from a start block, the process advances to decision block 802 where a determination is made as to whether play back is selected for one or more monitored flows that is being recorded in real time. If false, the process moves to decision block 810 where real-time analysis is performed for the one or more recorded flows. However, if the determination at decision block 802 is true, the process flows to block 804 where at least one value is selected for playing back at least a portion of one or more monitored flows being recorded in real time. The one or more selected values may include, but are not limited to a time, byte pattern, offset, sequence number, checksum, pointer, destination port, source port, payload, or the like.

At block 806, the play back of at least one monitored flow that is being recorded in real time based at least in part on the selected value. The one or more selected values enable fast and efficient analysis of a relatively large number of packets without having to examine every packet of the recorded flow. In some of the various embodiments, one or more recorded flows may be retrieved, rather than played back.

At decision block 808, another determination is made as to whether play back at least one monitored flow that is being recorded in real time. If affirmative, the process returns to block 804 and substantially the same actions are performed as described above. However, if the determination at decision block 808 is negative, the process steps to block 810 and analysis is performed for the one or more monitored flows that is being recorded in real time. In at least one of the various embodiments, the analysis of the one or more monitored flows that is being recorded in real time may be based on playing back at least a portion of the recording. In at least one of the various embodiments, the system could buffer the packets associated with a monitored flow while performing some level of real-time analysis. In some embodiments, this real-time analysis may be for the purpose of triggering (e.g., determining if a trigger has occurred). If a trigger is detected, then the beginning of the flow (e.g., the buffered packets associated with the flow) can be played back for further and/or deeper analysis. In at least one of various embodiments, a predetermined amount of a beginning of the flow may be played back. In some other embodiments, the play back may be internal to an analysis engine for the purpose of deeper analysis.

Also, in at least one of the various embodiments, the play back actions may be associated with a dashboard that may be arranged to operate automatically and/or manually. Further, a display may be provided for displaying information in real time regarding one or more packets and/or information regarding the one or more monitored flows that is being recorded in real time, play back of the recorded flow(s), and other monitored flows. In at least one of the various embodiments, analysis may be performed on the at least one monitored flow that is being recorded in real time, the play back of the recorded flow(s), and other monitored flows, which may include statistics, reports, or the like. In at least one of the various embodiments, the displayed information and/or analysis may be displayed to an administrator and/or provided to a separate application for subsequent processing. Moving from block 810, the process returns to performing other actions.

Figure 9:
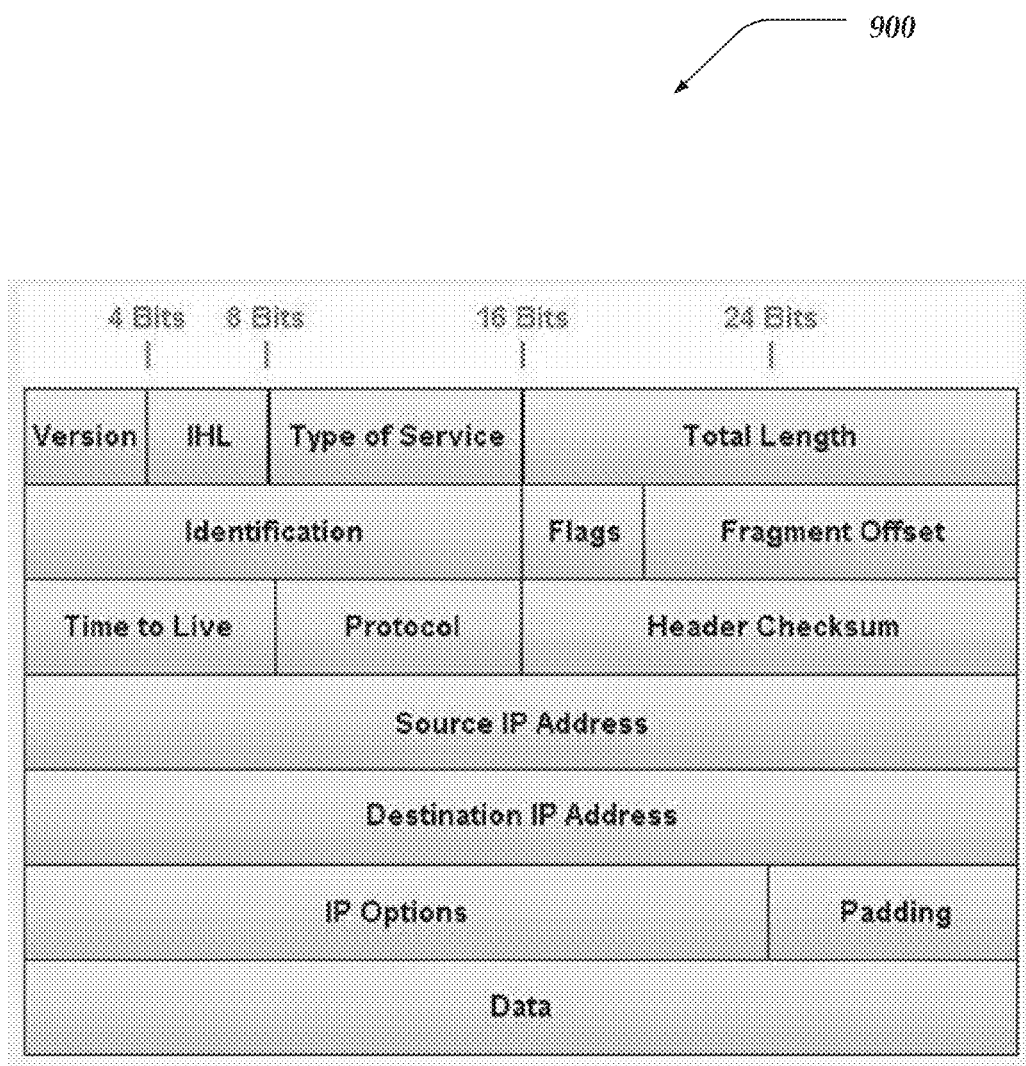
FIG. 9 shows an exemplary embodiment of a TCP packet header in accordance with at least one of the various embodiments.

FIG. 9 shows an exemplary embodiment of an Internet Protocol (IP) packet 900 in accordance with at least one of the various embodiments. As shown, packet 900 may contain a variety of information, including but not limited to version, type of service, total length, identification, flags, fragment offset, time to live, protocol, header checksum, source IP address, destination IP address, Padding and data. In at least one of the various embodiments, other protocols or protocol layers (not shown in FIG. 9) may be employed to in identifying a packet as corresponding to a monitored flow. For example, the source port address and destination address and sequence number and/or other L4 header information may be employed in identifying a packet as corresponding to a monitored flow. However, there are many other aspects of a packet either singly or in combination with these elements that may also be used to identify a packet and its corresponding monitored flow.

What is claimed as new and desired to be protected by Letters Patent of the United States is:

1. A method for improving the monitoring of flows of packets over a network, wherein a network computer performs the method by executing actions, comprising:
   selecting one or more of a plurality of flows for passive monitoring in real time over a network, wherein one or more other flows are related to the selected one or more flows;
   providing one or more triggers that is initiated in real time by one or more conditions that are associated with the one or more selected flows, wherein the one or more other flows are unassociated with the one or more conditions;
   buffering in real time the one or more selected flows in a buffer, wherein each selected flow is arranged as a thread in the buffer;
   when one of the plurality of selected flows dominates a capacity of the buffer, executing one or more actions including:
      modifying the real-time buffering of the dominant selected flow to reduce an amount of corresponding packets buffered in the buffer; or
      instantiating a new buffer to separately buffer in real time the dominant selected flow; and
   when the one or more conditions occurs and initiates the one ormore triggers, recording in real time each packet for the one or more selected flows that is associated with the one or more conditions and each packet for the one or more other flows, wherein each buffered packet for the one or more selected flows is recorded in real time along with the selected flow's packets and each packet for the one or more other flows that are received after the initiation of the one or more triggers.

2. The method of claim 1, further comprising:
   selecting at least one value of the one or more recorded flows, wherein the at least one selected value includes time, byte pattern, offset, sequence number, checksum, pointer, destination port, source port, destination address, source address or payload; and
   employing the selected value to play back or retrieve at least a portion of the one or more recorded flows.

3. The method of claim 1, further comprising enabling in real time analysis and play back of the one or more recorded flows regarding the occurrence of the one or more conditions.

4. The method of claim 1, further comprising providing a dashboard to control the playback and display of the one or more recorded flows.

5. The method of claim 1, further comprising employing information from one or more of a plurality of protocols and one or more of a plurality of protocol layers to identify each packet corresponding to the one or more selected flows.

6. The method of claim 1, wherein the one or more conditions, further comprises information from one or more of a plurality of protocols and one or more of a plurality of protocol layers.

7. A network computer for improving the monitoring of flows of packets over a network, comprising:
   a transceiver device for monitoring communication over the network;
   a memory device for storing at least instructions; and
   a processor device that is operative to execute instructions that enable actions, including:
   selecting one or more of a plurality of flows for passive monitoring in real time over a network, wherein one or more other flows are related to the selected one or more flows;
   providing one or more triggers that is initiated in real time by one or more conditions that are associated with the one or more selected flows, wherein the one or more other flows are unassociated with the one or more conditions;
   buffering in real time the one or more selected flows in a buffer, wherein each selected flow is arranged as a thread in the buffer;
   when one of the plurality of selected flows dominates a capacity of the buffer, further enabling one or more actions including:
      modifying the real-time buffering of the dominant selected flow to reduce an amount of corresponding packets buffered in the buffer; or
      instantiating a new buffer to separately buffer in real time the dominant selected flow; and
   when the one or more conditions occurs and initiates the one or more triggers, recording in real time each packet for the one or more selected flows that is associated with the one or more conditions and each packet for the one or more other flows, wherein each buffered packet for the one or more selected flows is recorded in real time along with the selected flow's packets and each packet for the one or more other flows that are received after the initiation of the one or more triggers.

8. The network computer of claim 7, further comprising:
   selecting at least one value of the one or more recorded flows, wherein the at least one selected value includes time, byte pattern, offset, sequence number, checksum, pointer, destination port, source port, destination address, source address or payload; and
   employing the selected value to play back or retrieve at least a portion of the one or more recorded flows.

9. The network computer of claim 7, further comprising enabling in real time analysis and play back of the one or more recorded flows regarding the occurrence of the one or more conditions.

10. The network computer of claim 7, further comprising providing a dashboard to control the playback and display of the one or more recorded flows.

11. The network computer of claim 7, further comprising employing information from one or more of a plurality of protocols and one or more of a plurality of protocol layers to identify each packet corresponding to the one or more selected flows.

12. The network computer of claim 7, wherein the one or more conditions, further comprises information from one or more of a plurality of protocols and one or more of a plurality of protocol layers.

13. A system for improving the monitoring of flows of packets over a network, comprising:
a first network computer that includes:
a transceiver device for monitoring communication over the network;
a memory device for storing at least instructions; and
a processor device that is operative to execute instructions that enable actions, comprising communicating one or more flows of packets with at least a second network computer; and
a third network computer that includes:
a transceiver device for monitoring communication between the first network computer and the second network computer;
a memory device for storing at least instructions; and
a processor device that is operative to execute instructions that enable actions, comprising:
selecting one or more of the plurality of flows for passive monitoring in real time over a network, wherein one or more other flows are related to the selected one or more flows;
providing one or more triggers that is initiated in real time by one or more conditions that are associated with the one or more selected flows, wherein the one or more other flows are unassociated with the one or more conditions;
buffering in real time the one or more selected flows in a buffer, wherein each selected flow is arranged as a thread in the buffer; and
when one of the plurality of selected flows dominates a capacity of the buffer, enabling one or more further actions including:
modifying the real-time buffering of the dominant selected flow to reduce an amount of corresponding packets buffered in the buffer; or
instantiating a new buffer to separately buffer in real time the dominant selected flow;
when the one or more conditions occurs and initiates the one or more triggers, recording in real time each packet for the one or more selected flows that is associated with the one or more conditions and each packet for the one or more other flows, wherein each buffered packet for the one or more selected flows is recorded in real time along with the selected flow's packets and each packet for the one or more other flows that are received after the initiation of the one or more triggers.

14. The system of claim 13, wherein the actions of the third network computer further comprise:
selecting at least one value of the one or more recorded flows, wherein the at least one selected value includes time, byte pattern, offset, sequence number, checksum, pointer, destination port, source port, destination address, source address or payload; and
employing the selected value to play back or retrieve at least a portion of the one or more recorded flows.

15. The system of claim 13, wherein the actions of the third network computer further comprise enabling in real time analysis and play back of the one or more recorded flows regarding the occurrence of the one or more conditions.

16. The system of claim 13, wherein the actions of the third network computer further comprise providing a dashboard to control the playback and display of the one or more recorded flows.

17. The system of claim 13, wherein the actions of the third network computer further comprise employing information from one or more of a plurality of protocols and one or more of a plurality of protocol layers to identify each packet corresponding to the one or more selected flows.

18. The system of claim 13, wherein the one or more conditions, further comprises information from one or more of a plurality of protocols and one or more of a plurality of protocol layers.

19. A processor readable non-transitive storage media that includes instructions for improving the monitoring of flows of packets over a network, wherein execution of the instructions by a network computer enables actions, comprising:
selecting one or more of a plurality of flows for passive monitoring in real time over a network, wherein one or more other flows are related to the selected t one or more flows;
providing one or more triggers that is initiated in real time by one or more conditions that are associated with the one or more selected flows, wherein the one or more other flows are unassociated with the one or more conditions;
buffering in real time the one or more selected flows in a buffer, wherein each selected flow is arranged as a thread in the buffer;
when one of the plurality of selected flows dominates a capacity of the buffer, enabling one or more further actions including:
modifying the real-time buffering of the dominant selected flow to reduce an amount of corresponding packets buffered in the buffer; or
instantiating a new buffer to separately buffer in real time the dominant selected flow; and
when the one or more conditions occurs and initiates the one or more triggers, recording in real time each packet for the one or more selected flows that is associated with the one or more conditions and each packet for the one or more other flows, wherein each buffered packet for the one or more selected flows is recorded in real time along with the selected flow's packets and each packet for the one or more other flows that are received after the initiation of the one or more triggers.

20. The media of claim 19, further comprising:
selecting at least one value of the one or more recorded flows, wherein the at least one selected value includes time, byte pattern, offset, sequence number, checksum, pointer, destination port, source port, destination address, source address or payload; and
employing the selected value to play back or retrieve at least a portion of the one or more recorded flows.

21. The media of claim 19, further comprising enabling in real time analysis and play back of the one or more recorded flows regarding the occurrence of the one or more conditions.

22. The media of claim 19, further comprising providing a dashboard to control the playback and display of the one or more recorded flows.

23. The media of claim 19, further comprising employing information from one or more of a plurality of protocols and one or more of a plurality of protocol layers to identify each packet corresponding to the one or more selected flows.

24. The media of claim 19, wherein the one or more conditions, further comprises information from one or more of a plurality of protocols and one or more of a plurality of protocol layers.

* * * * *